United States Patent
Hong

(10) Patent No.: US 8,391,150 B2
(45) Date of Patent: Mar. 5, 2013

(54) BUFFER STATUS REPORTING METHOD FOR UPLINK SCHEDULING AND COMMUNICATION SYSTEM USING THE SAME

(75) Inventor: Tae Chul Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 331 days.

(21) Appl. No.: 12/823,493

(22) Filed: Jun. 25, 2010

(65) Prior Publication Data

US 2011/0141983 A1    Jun. 16, 2011

(30) Foreign Application Priority Data

Dec. 16, 2009  (KR) .................. 10-2009-0125623

(51) Int. Cl.
*H04J 1/16* (2006.01)
(52) U.S. Cl. ........................ 370/235; 370/236
(58) Field of Classification Search .................. 370/322, 370/329, 341, 346, 348, 349, 235, 236, 363, 370/368, 374, 377, 378, 384, 428, 429
See application file for complete search history.

(56) References Cited

U.S. PATENT DOCUMENTS

| | | | | |
|---|---|---|---|---|
| 7,953,064 | B2 * | 5/2011 | Ahluwalia | ...... 370/349 |
| 8,031,655 | B2 * | 10/2011 | Ye et al. | ...... 370/328 |
| 8,160,012 | B2 * | 4/2012 | Chun et al. | ...... 370/329 |
| 2009/0052420 | A1 | 2/2009 | Fischer | |
| 2009/0080380 | A1 | 3/2009 | Chun et al. | |
| 2009/0113086 | A1 * | 4/2009 | Wu et al. | ...... 710/56 |
| 2009/0125650 | A1 | 5/2009 | Sebire | |
| 2010/0271990 | A1 * | 10/2010 | Leelahakriengkrai et al. | ...... 370/310 |
| 2011/0242972 | A1 * | 10/2011 | Sebire et al. | ...... 370/229 |
| 2012/0039204 | A1 * | 2/2012 | Gao et al. | ...... 370/252 |
| 2012/0093121 | A1 * | 4/2012 | Zhang | ...... 370/329 |
| 2012/0099452 | A1 * | 4/2012 | Dai et al. | ...... 370/252 |

FOREIGN PATENT DOCUMENTS

| | | |
|---|---|---|
| KR | 2002-0004645 A | 1/2002 |
| KR | 2006-0082733 A | 7/2006 |
| KR | 2006-0082734 A | 7/2006 |
| KR | 2006-0105859 A | 10/2006 |
| KR | 2006-0105860 A | 10/2006 |
| KR | 2007-0121576 A | 12/2007 |
| KR | 2008-0076632 A | 8/2008 |

* cited by examiner

*Primary Examiner* — Brenda H Pham
(74) *Attorney, Agent, or Firm* — Rabin & Berdo, P.C.

(57) ABSTRACT

In a satellite communication system having a long round-trip delay time, a user terminal reports initial buffer status information when the communication between the satellite and the use terminal started. When a trigger, a timer or padding requiring buffer status information report is generated, the user terminal checks whether there are data to be re-transmitted due to transmission failure from the previous BSR. When transmission-failed data exists, the user terminal sets buffer status amount, which is reported through BSR, as a value that is obtained by adding the amount of transmission-failed data to the amount of newly added after previous report. When there are no transmission-failed data, the user terminal reports BSR which is set as the amount of newly added data to the buffer after previous report. For discriminating entire buffer status reporting and the increased amount of data reporting, the reserved index of a header file is used.

12 Claims, 4 Drawing Sheets

FIG. 5

| INDEX | LCID VALUES |
|---|---|
| 00000 | CCCH |
| 00001-01010 | IDENTITY OF THE LOGICAL CHANNEL |
| 01011-11001 | RESERVED |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

BUFFER STATUS REPORTING METHOD FOR UPLINK SCHEDULING AND COMMUNICATION SYSTEM USING THE SAME

CROSS-REFERENCE TO RELATED APPLICATIONS

This application claims priority under 35 U.S.C. §119 to Korean Patent Application No. 10-2009-125623, filed on Dec. 16, 2009, in the Korean Intellectual Property Office, the disclosure of which is incorporated herein by reference in its entirety.

TECHNICAL FIELD

The following disclosure relates to a buffer status reporting method for uplink scheduling and a communication system using the same, and in particular, to a method and system, which reports the buffer status of a terminal for uplink scheduling in a system having a very long round trip delay time like a satellite communication system.

BACKGROUND

In communication system, scheduling algorithms uses two kinds of measurement information, i.e., channel status information and traffic measurement information (quantity and priority) for scheduling. Such information is obtained using feedback through a signaling channel, direct measurement in a base station (eNodeB: Evolved NodeB), or both. The quantity of feedback is an importantly considered element. The channel status information and the traffic information helps increase scheduling efficiency, but takes high overhead cost. Such trade-off is common to all systems using a feedback-based resource scheduling scheme.

Generally, in the case of downlink scheduling, buffer information may directly be obtained from a base station (eNodeB), and channel information may be obtained through a Channel Quality Indicator (CQI) that is used for an adaptive modulation and coding scheme. On the other hand, in the case of uplink scheduling, channel information may be obtained through a packet that is directly received from a base station (eNodeB), and buffer information may be obtained through Buffer Status Reporting (BSR) feedback from User Equipment (UE).

3GPP-LTE provides a BSR scheme for uplink scheduling. The BSR scheme may largely divided into regular BSR, periodic BSR and padding BSR. Whether these BSR schemes are performed is determined through a timer that is set in Radio Resource Control (RRC) or a trigger that is started by a specific event, and detailed content is as follows.

For regular BSR and periodic BSR:
In Transmit Time Interval (TTI) where BSR is transmitted, long BSR is reported when one or more Logical Channel Groups (LCG) have data usable for transmission.
Otherwise, short BSR is reported.

For padding BSR:
When the number of padding bits is equal to or larger than the size that is obtained by adding a sub-header to short BSR or is less than the size that is obtained by adding a sub-header to long BSR
In TTI where BSR is transmitted, when one or more LCG have data usable for transmission, the truncated BSR of an LCG having a logic channel of the highest priority that has transmittable data is reported.
Otherwise, short BSR is reported.

When the number of padding bits is equal to or larger than magnitude that is obtained by adding a sub-header to long BSR, long BSR is reported.

In BSR Medium Access Control (MAC) elements, the associated with BSR is configured with the following elements.

Short BSR and truncated BSR format: one buffer size field related to one LCG ID field
Long BSR format: LCG ID #0 to #3 associated with four buffer size fields BSR format is checked through a MAC Packet Data Unit (PDU) sub-head having LCID. LCG ID and buffer size are defined as follows.

LCG ID: this is used to check a logic channel group in which a buffer status is reported with a logic channel group ID field. The length of the field is 2 bits.

Buffer size: a buffer size field is used to check the total amount of data usable through all the logic channels of a logic channel group after an MAC PDU is generated. The amount of data is indicated in byte units. A Radio Link Control (RLC) layer and a Packet Data Convergence Protocol (PDCP) layer include all data usable for transmission. The size of an RLC header and the size of an MAC header are not included in the calculating of buffer size. The length of this field is 6 bits.

In FIGS. 1 and 2, the type of a BSR format is illustrated. FIG. 1 illustrates a short or truncated BSR format. FIG. 2 illustrates a long BSR format.

The above-described buffer status reporting method of 3GPP LTE is made on the assumption of the short round-trip delay of a terrestrial communication system. On the other hand, in a satellite communication system, because buffer status information from UE is transferred from a satellite base station after a very long round-trip delay, there are limitations caused by the long round-trip delay. For example, since very long time is taken until a base station receives BSR relative to the terrestrial communication system, it is difficult to predict the change of a terminal buffer that occurs for the long time. That is, a base station cannot determine whether current-received BSR information is the one that data scheduled to be transmitted are reflected or not.

Moreover, since a satellite communication system having a long round-trip delay consequently performs uplink scheduling on the basis of the past buffer status information of a terminal, scheduling may not be performed in spite of much data to be transmitted, or scheduling may be performed even when there is no data to be transmitted.

There is a method proposed for decreasing the number of BSR times, in a terrestrial communication system. In this method, a base station predicts the buffer status estimation value of a terminal, compares the predicted value with an actual buffer status, and performs BSR only when the predicted value exceeds a certain critical value, thereby decreasing the number of BSR times. Since the base station predicts the buffer status of the terminal until a next buffer status is reported on the basis of initial buffer status information, it may less be affected by a long round-trip delay.

However, there is possibility that limitations may occur when the method is directly applied to the satellite communication system. If the buffer status estimation value of a terminal in a base station is expressed as Equation (1) below at arbitrary time '$t_0$', the actual buffer status of the terminal after Round Trip Time (RTT)/2 is expressed as Equation (2) below.

$$B(t_0)=B_0-R_A \quad (1)$$

$$B(t_0+\tfrac{1}{2}*RTT)=B_0-R_A+B_n \quad (2)$$

where $B_0$ is the initial buffer status of a terminal, $R_A$ is a capacity which a base station allocates to the terminal through scheduling at time '$t_0$', and $B_n$ is the amount of data that is newly generated and is added to a buffer.

At this point, when the terminal informs the base station of the buffer status "$B(t_0+\frac{1}{2}*RTT)$", there is a strong possibility that the actual buffer status of the terminal may be different from a reported value when the base station of the satellite communication system receives the message, unlike the terrestrial communication system.

This is because there is a possibility that a satellite base station additionally allocates $R_A'$ to a terminal or new $B_n'$ is additionally added to the terminal for time "$\frac{1}{2}*RTT$" when buffer status information is transmitted from the terminal to the satellite base station. If the terminal transmits BSR each time the amount of a buffer decreases by $R_A$, the base station may calculate the additionally-decreased amount of the buffer on the basis of a value that is reported and an amount that is allocated to the terminal during the transmitting of BSR, but there is limitation that the amount of data that is newly added to the buffer for time "$\frac{1}{2}*RTT$" may not be reflected. Moreover, since the terminal does not transmit BSR each time the amount of the buffer decreases by $R_A$ but BSR is actually made through various reference triggers, a timer or padding, it is difficult for the base station to predict the accurate buffer status of the terminal on the basis of buffer status information that is reported in this way.

For example, when a satellite base station derives the buffer status of a terminal by using only buffer status information that is reported (i.e., the buffer status of the terminal that is decreased through scheduling in the base station is not derived), because the reporting of buffer status information increases or is identically maintained for a certain time although the amount of buffer of the terminal decreases through scheduling due to the long round-trip delay time of a satellite, scheduling may be performed even if there is no data to be transmitted. On the other hand, although the amount of the buffer increases newly, when the reporting of buffer status information is continuously made for a certain time during a preceding buffer status decreases, the reporting of buffer status information may be excluded from scheduling even though transmission should be started through scheduling.

SUMMARY

In one general aspect, a buffer status reporting method of a user terminal, in which the user terminal reports buffer status information to a base station for uplink scheduling in a communication system including the user terminal and the base station, includes: performing an initial reporting operation of reporting entire buffer status information of the user terminal when communication is started between the user terminal and the base station; and performing a successive reporting operation of reporting information on an amount of data which is increased after the buffer status reporting of the initial reporting operation.

The buffer status reporting method may further include performing an entire reporting operation of reporting an entire buffer status of the user terminal periodically or when a predetermined event occurs. The increased data amount may be a value obtained by adding an amount of data, which is waiting for being re-transmitted through feedback of transmission failure among data which has already been transmitted, to an amount of data which is newly added to the buffer of the user terminal.

Control information may be used for discriminating the data of the initial reporting operation and the data of the successive reporting operation. The control information may be transferred using a reserved index among indexes of a header file.

The successive reporting operation may not perform buffer status reporting when increased data does not exist in the buffer of the user terminal. The base station may be a communication satellite.

In another general aspect, a wireless communication system including a user terminal and a base station is characterized in that: the user terminal reports entire buffer status information to the base station when communication is started between the user terminal and the base station, and reports information on an amount of data, which is increased after reporting the entire buffer status information, to the base station, and the base station sets an entire status value as a buffer status value of a corresponding user terminal when entire buffer status information is reported from the user terminal, and increases the set buffer status value of the user terminal by a successive buffer status value when successive buffer status reporting is transferred from the user terminal.

The user terminal may re-report a entire buffer status of the user terminal periodically or when a predetermined event occurs, and the base station may reset the buffer status value of the user terminal as the entire status value when the entire buffer status is re-reported from the user terminal.

The base station may check whether the user terminal is selected for scheduling, and when the user terminal is selected for scheduling, the base station may decrease the buffer status value of the user terminal by a size of resource which is allocated through the scheduling.

Other features and aspects will be apparent from the following detailed description, the drawings, and the claims.

BRIEF DESCRIPTION OF THE DRAWINGS

FIG. 5 is a table showing the index of the header file of 3GPP LTE.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

In case of GEO satellite communication system, it is difficult to quickly update the buffer status of a UE due to a very long round-trip delay time. Therefore, it is preferable that a base station predicts the buffer status of the UE. Accordingly, the UE should enable the base station to accurately predict the buffer status of the UE through the reporting of buffer status information.

Hereinafter, exemplary embodiments will be described in detail with reference to the accompanying drawings.

Figure 1:
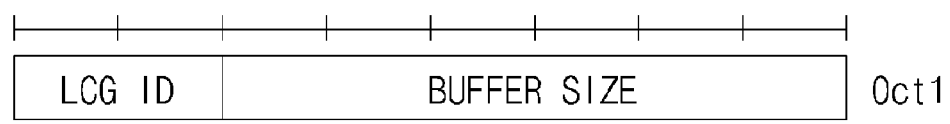
FIG. 1 is a diagram illustrating a short or truncated BSR format.
Figure 2:
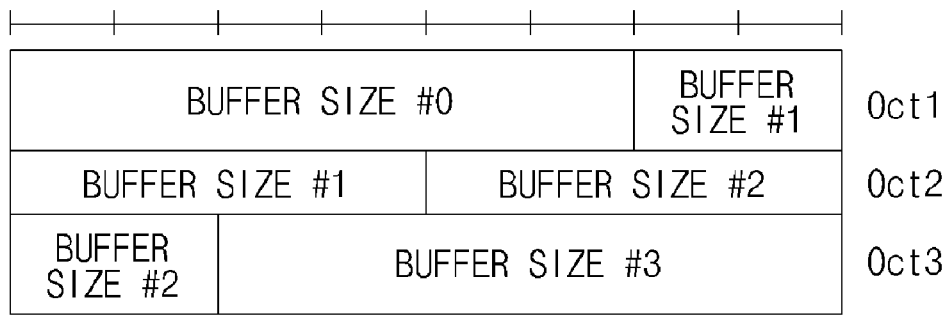
FIG. 2 is a diagram illustrating a long BSR format.
Figure 3:
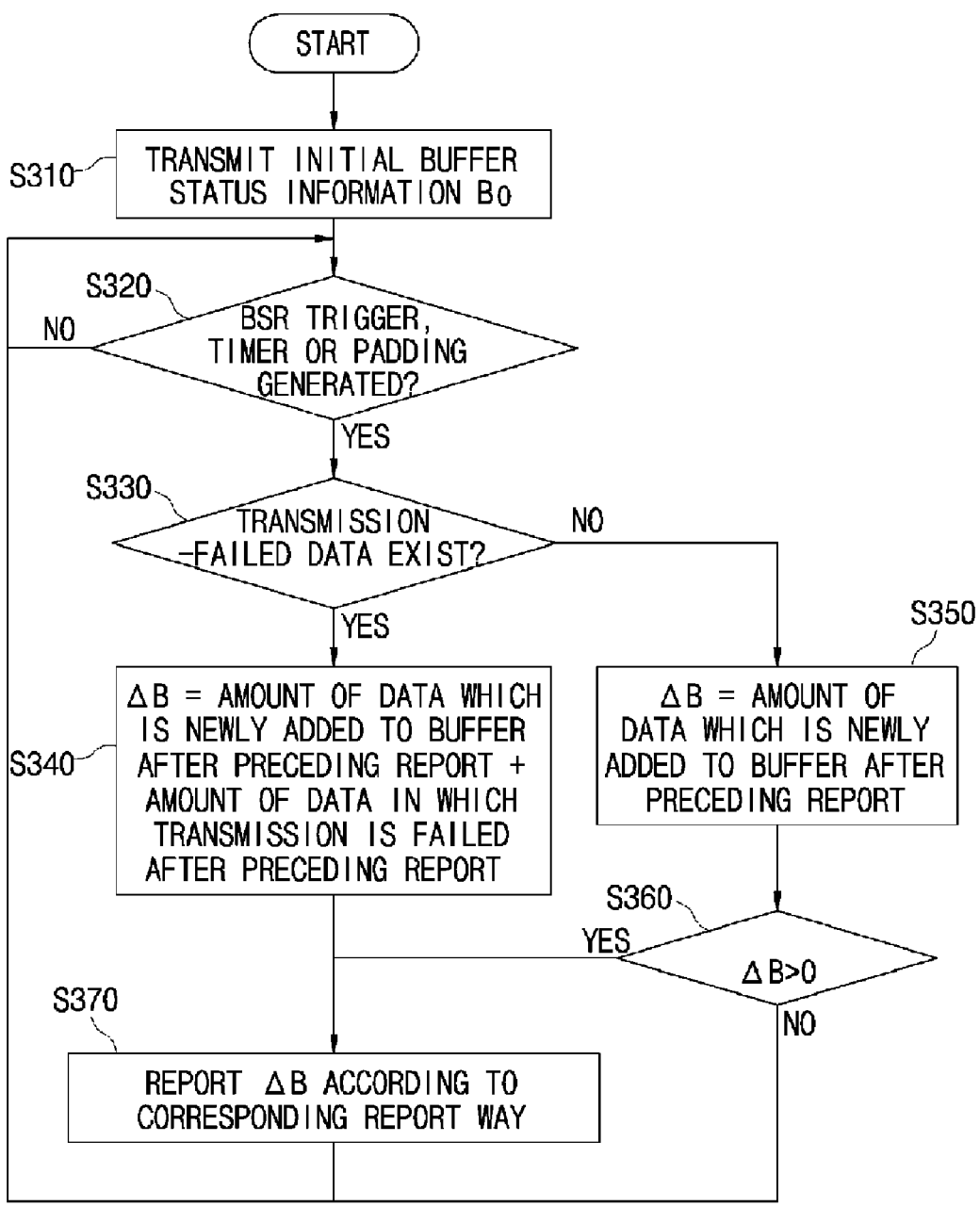
FIG. 3 is a flow chart illustrating a buffer status reporting method according to an exemplary embodiment.

FIG. 3 is a flow chart illustrating a buffer status reporting method according to an exemplary embodiment.

As illustrated in FIG. 3, when a UE starts communication for the first time, it reports initial buffer status information '$B_0$' in operation S310.

Subsequently, when a trigger, a timer, or a padding to perform BSR is generated in operation S320, the UE checks whether there are data to be re-transmitted due to transmission failure from the previous BSR to the current time in operation S330.

When there are transmission-failed data, the UE sets buffer status amount '$\Delta B$', which is reported through BSR, as a value that is obtained by adding the amount of data, which should be re-transmitted due to transmission failure after previous report, to the amount of data that is newly added to the buffer after previous report in operation S340. In this way, the UE reports the set BSR to a satellite in operation S370.

To the contrary, when there are no transmission-failed data, the UE sets buffer status amount '$\Delta B$', which is reported through BSR, as the amount of data that is newly added to the buffer after previous report in operation S350. Furthermore, the UE determines whether the set amount is larger than '0' in operation S360. When the set amount is larger than '0', the UE reports BSR in operation S370. When the set amount is not larger than '0', the UE does not report BSR.

If the UE reports BSR through this scheme, uncertainty about whether the amount of data that decreases through scheduling is reflected or not in BSR information received can be removed, when existing BSR is received from a base station. That is, in case that the base station has performed scheduling but data is not yet transmitted due to a long propagation delay time, the base station has already assumed the decrease of a buffer status, but when data is not transmitted to the UE and thereby buffer status information, in which the amount of data that is not yet transmitted is reflected, is reported to the UE, the base station again reflects the amount of data, which has already been reflected in pre-scheduling, in next scheduling.

According to the buffer status reporting method, information might be delayed but always reflected in the base station according to a BSR period, and the base station can accurately derive the buffer status of the UE.

When the UE reports buffer status information through the above-described method of FIG. 3, the base station derives the buffer status of the UE through a method that will be described below with reference to FIG. 4.

Figure 4:
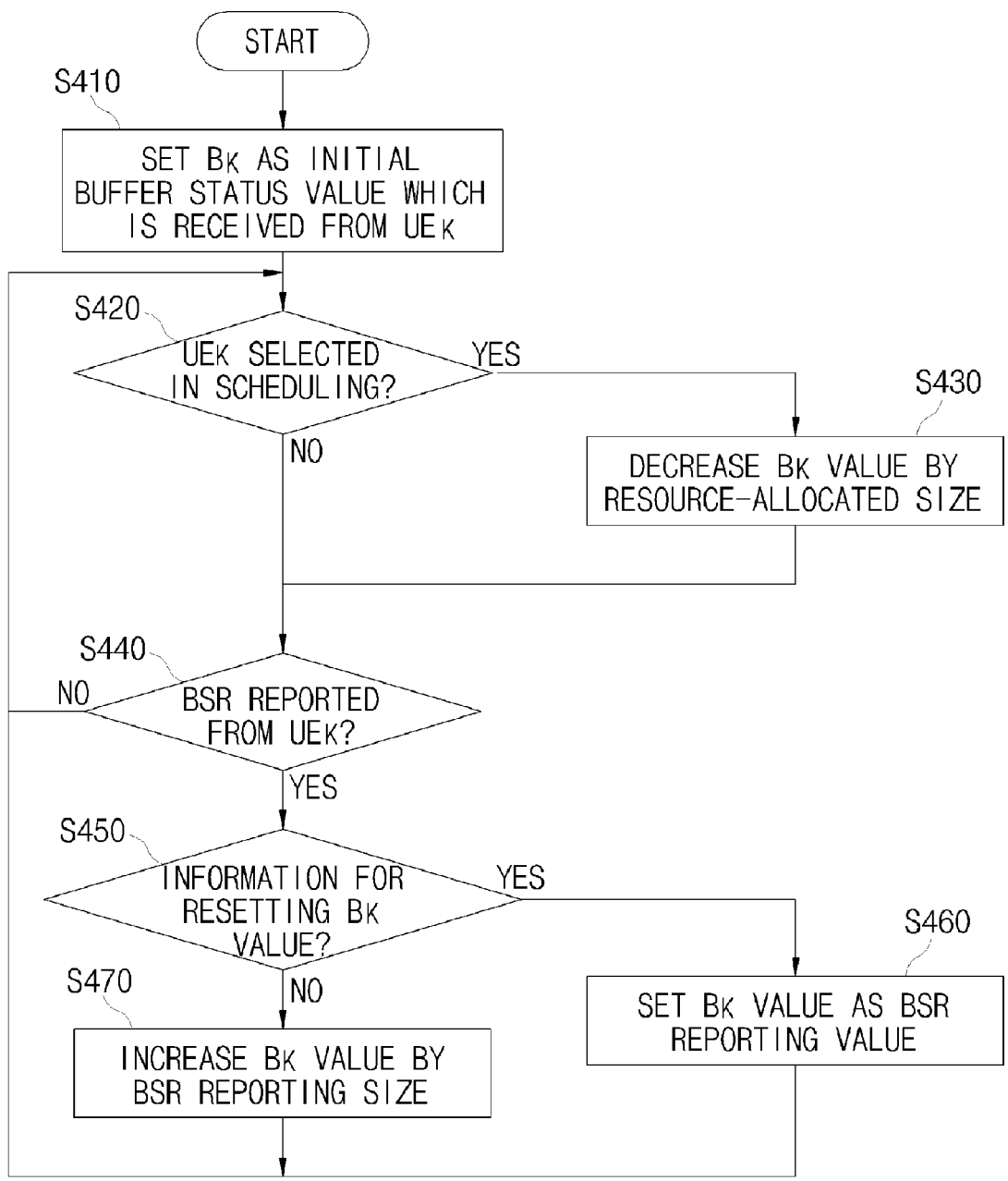
FIG. 4 is a flow chart illustrating a method in which a base station derives the buffer status of a user terminal.

FIG. 4 is a flow chart illustrating a method in which a base station derives the buffer status of a user terminal.

Referring to FIG. 4, when BSR for the initial buffer status is received from $UE_k$, the base station sets the received value as a $B_k$ value (which is a buffer status value for the $UE_k$) in operation S410.

Next, the base station checks whether the $UE_k$ is selected in scheduling in operation S420. When the $UE_k$ is selected in scheduling, the base station decreases the $B_k$ value by the size of resource that is allocated through scheduling in operation S430.

Subsequently, the base station checks whether BSR is reported from the $UE_k$ in operation S440. When BSR is reported, the base station checks whether the report is for resetting the $B_k$ value in operation S450. When the report is for resetting the $B_k$ value, the base station resets the $B_k$ value as the value reported in BSR in operation S460.

When the report of BSR is not for resetting the $B_k$ value, the base station increases the $B_k$ value by a value reported in BSR in operation S470.

The buffer status reporting method according to an exemplary embodiment does not continuously reports the entire size information of buffer data like the existing method. It reports the amount of initial buffer data at first, and then it reports buffer amount increased due to new-added data. Accordingly, in an LTE-based satellite communication system, a scheme for determining whether BSR is information of the amount of initial buffer data (or the entire size information of data which is in a buffer for allowing the $B_k$ value to be newly set) or information which reports buffer amount that is increased due to new-added data is required.

To this end, control information is used in the buffer status reporting method according to an exemplary embodiment, wherein the control information may be transferred with the reserved index of a header file.

To provide a description on 3GPP LTE as an example, as shown in FIG. 5, there are reserved indexes in the header file of 3GPP LTE. These reserved indexes can be used to determine the type of BSR. For example, when it is assumed that values representing truncated BSR, short BSR and long BSR of the related art are for a method of reporting buffer amount that is increased due to new-added data, three reserved indexes, "01011", "01100", and "01101", may be used for truncated BSR, short BSR and long BSR on the amount of initial buffer data, respectively. Accordingly, the buffer status reporting method according to an exemplary embodiment can easily be applied to a 3GPP LTE-based system.

In the above-described embodiments, although it has been described that the amount of the initial data buffer is reported and then the increased amount of a data buffer is reported, the entire size information of data in a buffer may be periodically transmitted for more accurate prediction. Reserved indexes can also be used for this case when the entire size information of data is transmitted to discriminate from a case in which buffer amount that is increased due to added data is reported.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A buffer status reporting method of a user terminal in which the user terminal reports buffer status information to a base station for uplink scheduling in a communication system including the user terminal and the base station, the buffer status reporting method comprising:

performing an initial reporting operation of reporting entire buffer status information of the user terminal when communication is started between the user terminal and the base station; and performing a successive reporting operation of reporting information on an amount of data which is increased after the buffer status reporting of the initial reporting operation, wherein the increased data amount is a value obtained by adding an amount of data, which is waiting for being re-transmitted through feedback of transmission failure among data which has already been transmitted, to an amount of data which is newly added to the buffer of the user terminal.

2. The buffer status reporting method of claim 1, further comprising performing an entire reporting operation of reporting an entire buffer status of the user terminal periodically or when a predetermined event occurs.

3. The buffer status reporting method of claim 1, wherein control information is used for discriminating the data of the initial reporting operation and the data of the successive reporting operation.

4. The buffer status reporting method of claim 3, wherein the control information is transferred using a reserved index among indexes of a header file.

5. The buffer status reporting method of claim 1, wherein the successive reporting operation does not perform buffer status reporting when increased data does not exist in the buffer of the user terminal.

6. The buffer status reporting method of claim 1, wherein the base station is a communication satellite.

7. A wireless communication system including a user terminal and a base station, characterized in that:
the user terminal reports entire buffer status information to the base station when communication is started between the user terminal and the base station, and reports information on an amount of data, which is increased after reporting the entire buffer status information, to the base station, and
the base station sets an entire status value as a buffer status value of a corresponding user terminal when entire buffer status information is reported from the user terminal, and increases the set buffer status value of the user terminal by a successive buffer status value when successive buffer status reporting is transferred from the user terminal,
wherein the increased data amount is a value obtained by adding an amount of data, which is waiting for being re-transmitted through feedback of transmission failure among data which has already been transmitted, to an amount of data which is newly added to the buffer of the user terminal.

8. The wireless communication system of claim 7, wherein:
the user terminal re-reports an entire buffer status of the user terminal periodically or when a predetermined event occurs, and
the base station resets the buffer status value of the user terminal as the entire status value when the entire buffer status is re-reported from the user terminal.

9. The wireless communication system of claim 7, wherein control information is used for discriminating the reporting of the entire buffer status and the successive buffer status reporting.

10. The wireless communication system of claim 9, wherein the control information is transferred using a reserved index among indexes of a header file.

11. The wireless communication system of claim 7, wherein the base station is a communication satellite.

12. The wireless communication system of claim 7, wherein the base station checks whether the user terminal is selected for scheduling, and when the user terminal is selected for scheduling, the base station decreases the buffer status value of the user terminal by a size of resource which is allocated through the scheduling.

* * * * *